United States Patent
Imamura

[19]

[11] Patent Number: 6,122,517
[45] Date of Patent: Sep. 19, 2000

[54] METHOD AND SYSTEM FOR ASSIGNING SPEECH CHANNEL IN MOBILE SYSTEM

[75] Inventor: Tomoyasu Imamura, Tokyo, Japan

[73] Assignee: NEC Corporation, Tokyo, Japan

[21] Appl. No.: 09/104,229

[22] Filed: Jun. 25, 1998

[30] Foreign Application Priority Data

Jun. 27, 1997 [JP] Japan .................................... 9-171939

[51] Int. Cl.[7] .................................................. H04Q 7/00
[52] U.S. Cl. ........................ 455/450; 455/509; 455/512; 455/513
[58] Field of Search ................................ 455/450, 63, 62, 455/451, 452, 455, 516, 512, 513, 509

[56] References Cited

U.S. PATENT DOCUMENTS

| | | | |
|---|---|---|---|
| 5,345,597 | 9/1994 | Strawczynski et al. ................ | 455/450 |
| 5,471,671 | 11/1995 | Wang et al. .......................... | 455/226.2 |
| 5,497,505 | 3/1996 | Koohgoli et al. ....................... | 455/452 |
| 5,884,145 | 3/1999 | Haartsen ................................... | 455/63 |
| 5,898,928 | 4/1999 | Karlsson et al. ......................... | 455/450 |
| 5,903,842 | 5/1999 | Wang et al. ............................. | 455/450 |
| 5,963,848 | 10/1999 | D'Avello ................................. | 455/62 |

*Primary Examiner*—Fan Tsang
*Assistant Examiner*—Isaak R. Jama
*Attorney, Agent, or Firm*—McGuire, Woods, Battle & Boothe, LLP

[57] ABSTRACT

A method and a system assign a speech channel difficult to cause interference in a radio mobile station and in both in the radio mobile station and a radio base station. A channel number is set, a usability judgment threshold value is read out to be compared with a reception field intensity of a selected speech channel. If the reception field intensity is relatively high, a preference of the speech channel is lowered. If the reception field intensity is relatively low, the channel is notified to the radio mobile station. If interference is present in the radio mobile station, the preference is again lowered and otherwise, process of establishing call connection is initiated.

8 Claims, 8 Drawing Sheets

(DIFFERENCE $\phi$ = RECEPTION FIELD INTENSITY −
USABILITY JUDGMENT THRESHOLD VALUE)

FIG. 7

PRIOR ART

METHOD AND SYSTEM FOR ASSIGNING SPEECH CHANNEL IN MOBILE SYSTEM

BACKGROUND OF THE INVENTION

1. Field of the Invention

The present invention relates generally to a mobile communication system, in which a plurality of radio base station have a plurality of speech channels (hereinafter simply referred to as "channel") in common, and assignment of channel is controlled in an autonomous distributing manner per each radio base station. More particularly, the invention relates to a method and a system for assigning speech channel used in the radio base station and a radio mobile station.

2. Description of the Related Art

Conventionally, an assignment method of channel in a mobile communication system of this type assigns channel which is expected to have little possibility of causing interference in radio environment of individual place on the basis of past experience, in automonously distributed fashion, as shown in Japanese Unexamined Patent Publication No. Heisei 1-80135 (Japanese Patent Application No. Showa 62-237876) for example.

Figure 7:
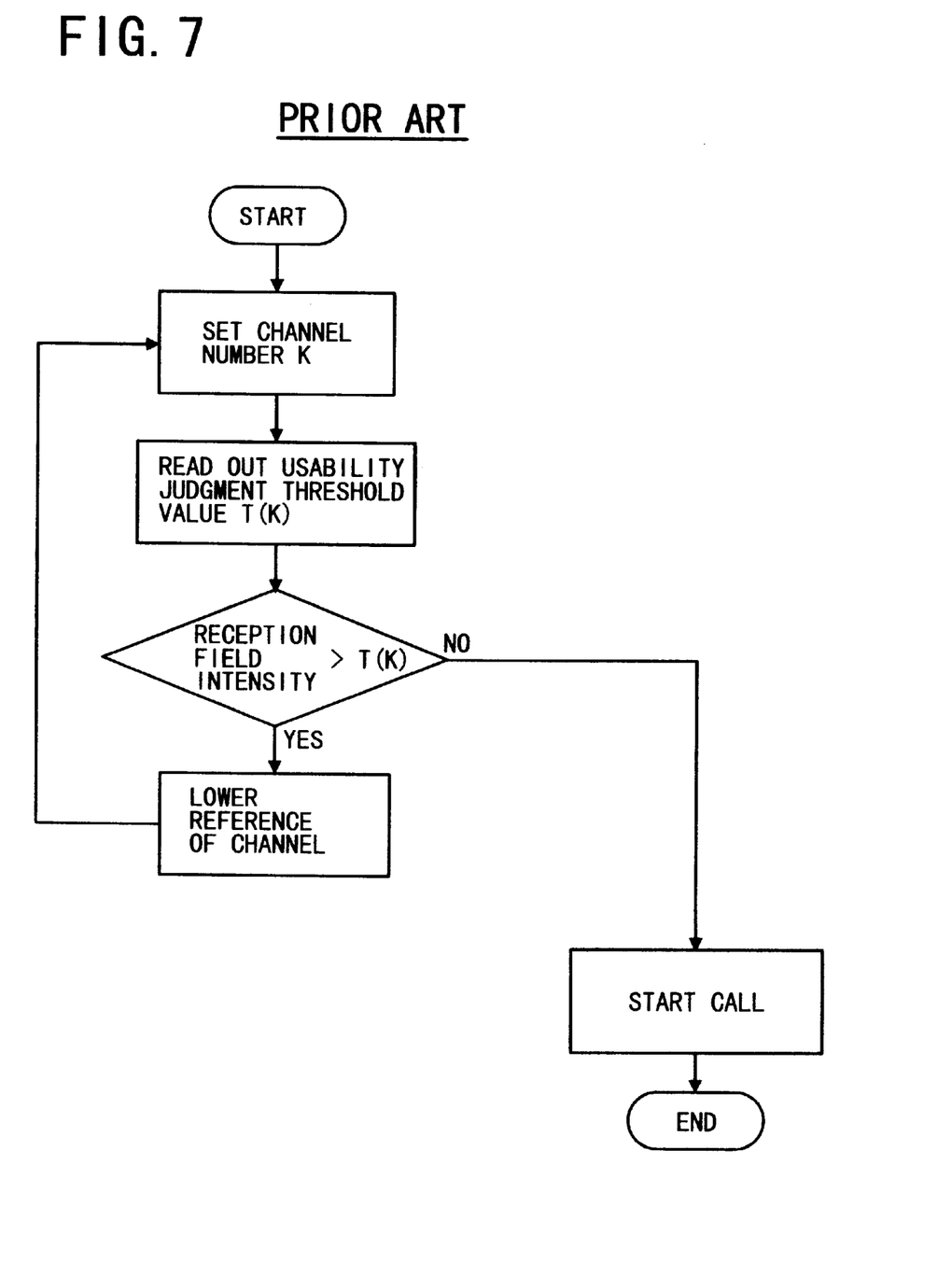
FIG. 7 is a flowchart of the conventional speech channel assignment method.

FIG. 7 is a flowchart showing the conventional speech channel assignment method. A radio base station has reference for determining order of sequence for assignment per channel. When communication with a radio mobile station becomes necessary, the radio base station reads out a channel number K having the highest reference, compares an instantaneous reception field intensity (can be interference wave) in the selected channel and usability judgment threshold value T(K) to make judgment whether the selected channel can be used or not. When judgment is made that the selected channel cannot be used, the channel in question is recognized as a channel easily causing interference to perform a process for lowering preference of the channel. Then, a channel having second highest preference is selected as a candidate channel to perform judgment that the candidate channel can be used or not. When judgment is made that the selected channel can be used, call is established through the selected channel.

The foregoing conventional channel assignment method encounters a drawbacks in that since the mobile communication system is used in a certain distance between the radio base station and the radio mobile station, even the assigned channel having high preference on the side of the ratio base station and being judged to have no interference in view of usability judgment threshold value, interference can be caused in the same channel on the radio mobile station. On the other hand, since only interference record on the radio base station side is reflected in determination of preference of the channel, spatial re-use of the channel becomes not possible. Even when interference is easily cause on the radio mobile station, such channel easily causing interference can be assigned again.

SUMMARY OF THE INVENTION

It is an object of the present invention to provide a method and system for assigning a channel which makes spatial re-use of the channel possible by assigning a channel having low possibility to cause interference even in a radio mobile station and preferentially using a channel having low possibility of causing interference in both of a radio base station and the radio mobile station.

According to the first aspect of the present invention, a method for assigning a speech channel of a mobile communication system, in which a plurality of radio base stations having a plurality of speech channels in common and a speech channel to be used is assigned in an autonomous distributing manner, comprises:

a step of setting a preference for assigning a speech channel in the radio base station;

a step of notifying a speech channel to the radio mobile station to establish call connection by the radio base station;

a step of measuring a radio interference condition of the speech channel notified by the radio base station and notifying the radio interference information to the radio base station, by the radio mobile station;

a step of modifying preference of the speech channel on the basis of the radio interference information of the speech channel received from the radio mobile station, by the radio base station; and a step of assigning new speech channel in the radio base station on the basis of modified preference.

According to a second aspect of the present invention, a method for assigning a speech channel of a mobile communication system, in which a plurality of radio base stations having a plurality of speech channels in common and a speech channel to be used is assigned in an autonomous distributing manner, comprises:

a step of setting a preference for assigning a speech channel in the radio base station;

a step of notifying a speech channel to the radio mobile station to establish call connection by the radio base station;

a step of deriving a difference between a field intensity of the speech channel noticed from the radio base station for notifying the difference to the radio base station, by the radio mobile station;

a step of modifying the preference of the speech channel on the basis of the difference noticed from the radio mobile station, by the radio base station; and a step of assigning new speech channel in the radio base station on the basis of modified preference.

According to a third aspect of the present invention, a method for assigning a speech channel of a mobile communication system, in which a plurality of radio base stations having a plurality of speech channels in common and a speech channel to be used is assigned in an autonomous distributing manner, comprises:

a step of setting a preference for assigning a speech channel in the radio base station;

a step of modifying the preference of the speech channel when radio interference is present in the assigned channel, in the radio base station;

a step of notifying a speech channel to the radio mobile station to establish call connection by the radio base station;

a step of measuring a radio interference condition of the speech channel notified by the radio base station and notifying the radio interference information to the radio base station, by the radio mobile station;

a step of modifying preference of the speech channel on the basis of the radio interference information of the speech channel received from the radio mobile station, by the radio base station; and a step of assigning new speech channel in the radio base station on the basis of modified preference.

According to a fourth aspect of the present invention, a method for assigning a speech channel of a mobile communication system, in which a plurality of radio base stations having a plurality of speech channels in common and a speech channel to be used is assigned in an autonomous distributing manner, comprises:

a step of setting a preference for assigning a speech channel in the radio base station;

a step of deriving a difference between a field intensity of the speech channel noticed from the radio base station for notifying the difference to the radio base station, by the radio base station;

a step of notifying a speech channel to the radio mobile station to establish call connection by the radio base station;

a step of deriving a difference between a field intensity of the speech channel noticed from the radio base station for notifying the difference to the radio base station, by the radio mobile station;

a step of modifying the preference of the speech channel on the basis of the difference noticed from the radio mobile station, by the radio base station; and a step of assigning new speech channel in the radio base station on the basis of modified preference.

According to the fifth aspect of the present invention, a system for assigning a speech channel of a mobile communication system, in which a plurality of radio base stations having a plurality of speech channels in common and a speech channel to be used is individually assigned in an autonomous distributing manner, and a plurality of radio mobile stations adapted for communication with the radio base stations using the speech channel comprises:

the radio mobile station including
means for measuring radio interference condition of a speech channel noticed from the radio base station; and
means for notifying a radio interference information resulting from the measurement to the radio base station; and the radio base station including
means for setting a preference of the speech channel to be assigned;
means for modifying the preference of the speech channel on the basis of the radio interference information of the channel received from the radio mobile station; and
means for assigning a new speech channel on the basis of a modified preference.

According to the sixth aspect of the present invention, a system for assigning a speech channel of a mobile communication system, in which a plurality of radio base stations having a plurality of speech channels in common and a speech channel to be used is individually assigned in an autonomous distributing manner, and a plurality of radio mobile stations adapted for communication with the radio base stations using the speech channel comprises:

the radio mobile station including
means for deriving a difference between a field intensity of the speech channel noticed by the radio base station and a threshold value; and
means for notifying the difference to the radio base station; and the radio base station including
means for setting a preference of the speech channel to be assigned;
means for modifying the preference of the speech channel on the basis of the difference notified by the radio mobile station in the extent corresponding to the difference; and
means for newly assigning a speech channel on the basis of modified preference.

According to the seventh aspect of the present invention, a system for assigning a speech channel of a mobile communication system, in which a plurality of radio base stations having a plurality of speech channels in common and a speech channel to be used is individually assigned in an autonomous distributing manner, and a plurality of radio mobile stations adapted for communication with the radio base stations using the speech channel comprises:

the radio mobile station including
means for measuring radio interference condition of a speech channel noticed from the radio base station; and
means for notifying a radio interference information resulting from the measurement to the radio base station; and the radio base station including
means for setting a preference of the speech channel to be assigned;
means for measuring radio interference condition of the assigned speech channel
means for modifying the preference of the speech channel on the basis of the radio interference information thus measured and the radio interference information of the channel received from the radio mobile station; and
means for assigning a new speech channel on the basis of a modified preference.

According to the eighth aspect of the present invention, a system for assigning a speech channel of a mobile communication system, in which a plurality of radio base stations having a plurality of speech channels in common and a speech channel to be used is individually assigned in an autonomous distributing manner, and a plurality of radio mobile stations adapted for communication with the radio base stations using the speech channel comprises:

the radio mobile station including
means for deriving a difference between a field intensity of the speech channel noticed by the radio base station and a threshold value; and
means for notifying the difference to the radio base station; and the radio base station including
means for setting a preference of the speech channel to be assigned;
means for deriving a difference between the field intensity of assigned speech channel and a threshold value;
means for modifying the preference of the speech channel on the basis of the difference thus derived and the difference notified by the radio mobile station in the extent corresponding to the difference; and
means for newly assigning a speech channel on the basis of modified preference.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

Figure 1:
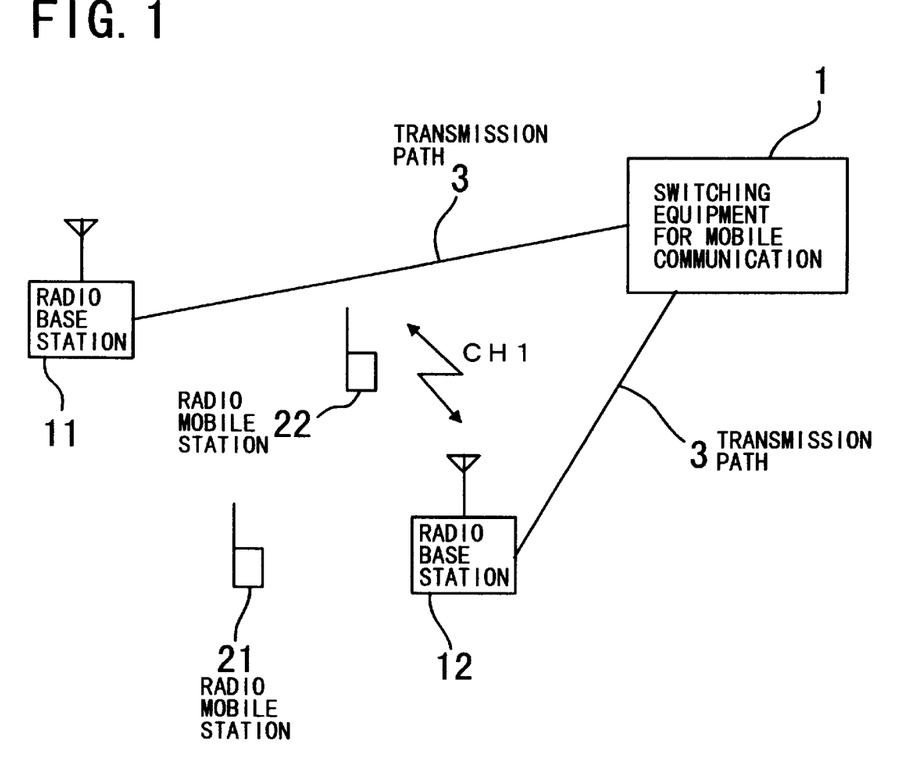
FIG. 1 is a block diagram showing a construction of a mobile communication system, to which a channel assignment method according to the present invention is applied.
Figure 2:
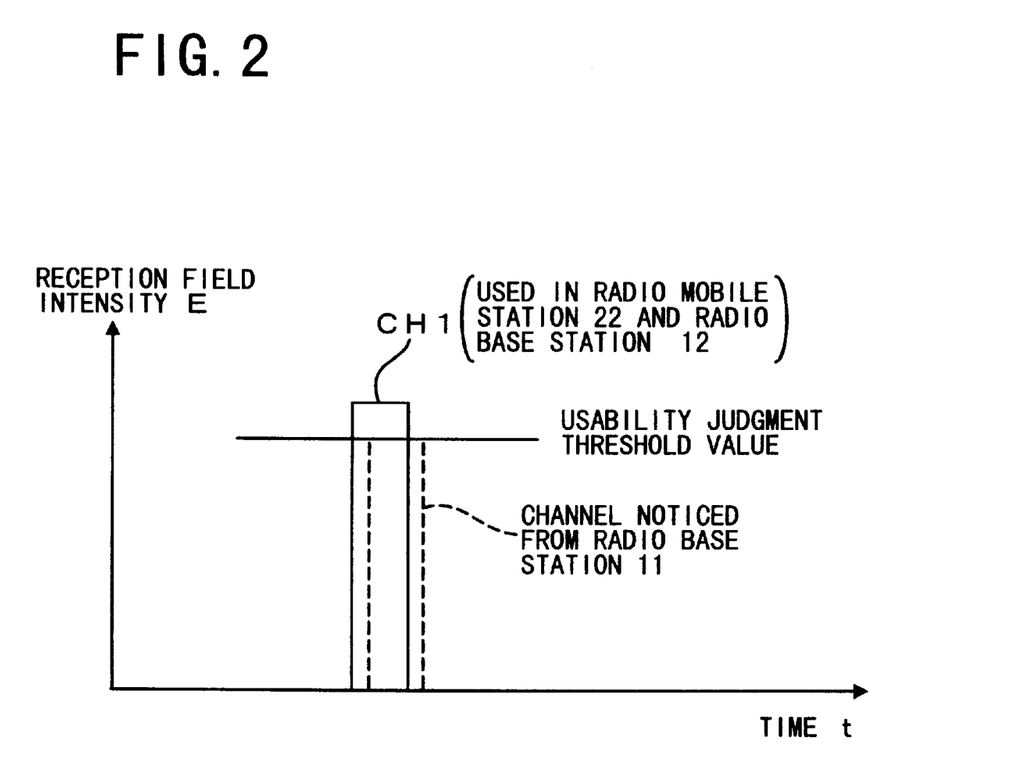
FIG. 2 is an illustration for explaining an interference model of a channel to be used in the system of FIG. 1.
Figure 3:
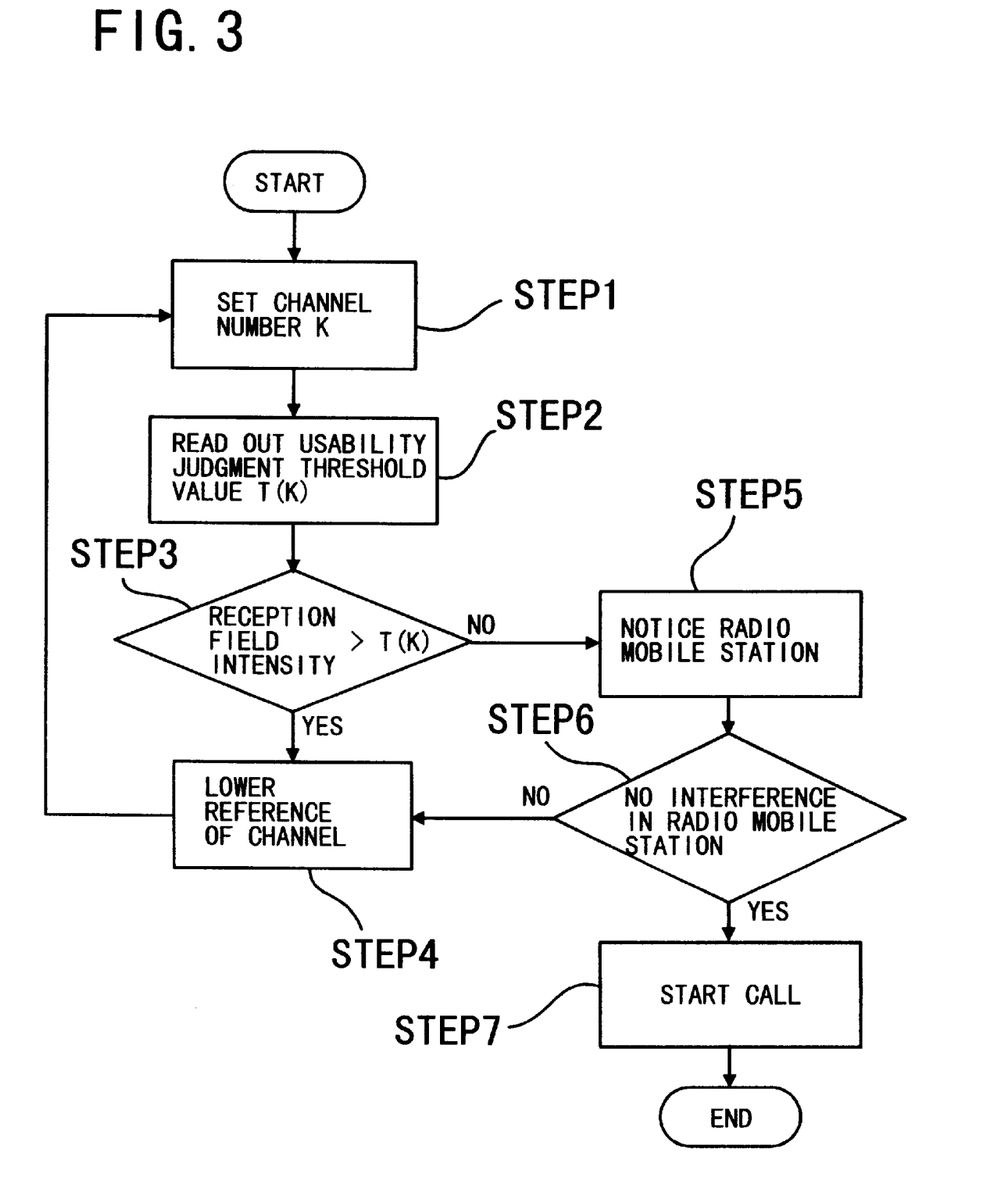
FIG. 3 is a flowchart showing one example of the channel assignment method of the present invention.

FIG. 1 is a block diagram showing a construction of a mobile communication system, to which a channel assignment method according to the present invention is applied, FIG. 2 is an illustration for explaining an interference model of a channel to be used in the system of FIG. 1, and FIG. 3 is a flowchart showing one example of the channel assignment method of the present invention.

The preferred embodiment of a mobile communication system of FIG. 1 includes a switching equipment 1 for mobile communication, radio base stations 11 and 12, radio mobile stations 21 and 22. The radio mobile station 21 establishes radio connection for call with the radio base station 11, and the radio mobile station 22 establishes radio connection for call with the radio base station 12. The radio mobile stations 21 and 22 have a plurality of channels in common. The radio base stations 11 and 12 have available channels as common resource. The radio base stations 11 and 12 are connected to the switching equipment 1 for mobile communication via transmission path 3.

Next, operation will be discussed with reference to the drawings.

In FIG. 1, the radio mobile station 22 and the radio base station 12 are currently in communication at a channel CH1. Here, it is assumed that the radio mobile station 21 newly start communication with the radio base station 11, and the radio base station 11 has preference per channel to set the channel of the highest preference as a use channel candidate. The channel of the highest preference is the channel CH1.

Currently, the channel CH1 is occupied for communication between the radio mobile station 21 and the radio base station 12. However, since the radio mobile station 22 is far distant from the radio base station 11 and since a reception level of the channel CH1 between the radio mobile station 22 and the radio base station 11 is lower than usability judgment threshold value, the channel CH1 is judged to be useful in the radio base station 11 so that the channel CH1 is noticed as use channel to the radio mobile station 21.

FIG. 2 shows the status of radio interference in the radio mobile station 21 in the condition set forth above. Namely, the channel CH1 to which no interference is judged in the radio base station 11, is judged as interference being present as reception level being in excess of the usability judgment threshold value.

Hereinafter, a procedure of the preferred embodiment of a communication channel assignment method according to the present invention will be explained with reference to FIG. 3.

The radio base station has preference of channel per channel. When the radio base station needs to communicate with the radio mobile station, the channel number K of the highest preference is read out as a candidate (step 1). Then, reception filed intensity is measured and the measured reception field intensity and the usability judgment threshold valve T(K) are read out (step 2) for comparison for checking whether interference is present or not (step 3). When the reception field intensity>T(K), namely, the channel is judged as not being useful, a process for lowering preference of the channel selected as candidate as being interfered (step 4). In this case, a difference between the reception field intensity and the usability judgment threshold value is derived to lower the preference of the channel in question in an extent corresponding to the difference. Thereafter, a use channel is retrieved again (step 1). On the other hand, when the reception field intensity<T(K), namely, the channel is judged as being useful, the channel selected is noticed to the radio mobile station (step 5). On the side of the radio mobile station, interference is again checked (step 6). In this case, when presence of interference is judged as shown in FIG. 2, the difference between the reception field intensity and the usability judgment threshold valve is derived Then, the radio mobile station transmits a request for changing of channel together with the difference thus derived. The radio base station is responsive to the notice from the radio mobile station to lower the preference of the channel in question in the extent corresponding to the difference noticed from the radio mobile station for possibility of causing interference (step 4). Then, process is returned to step 1 to again retrieve the channel to be used.

By modifying preference of the channel in the manner set forth above, assignment of channel can be done starting from channel having lesser record of causing interference. Then, communication is initiated with the channel which is judged as being useful in both of the radio base station and the radio mobile station (step 7).

By the foregoing operation, in the preferred embodiment of the mobile communication system according to the present invention, as channels having high preference, channels having lesser records of occurrence of interference are concentrated to enable spatial re-use of the channel between the radio base stations.

On the other hand, since the channel having lesser possibility of causing interference can be noticed to the radio mobile station, and the channel having lesser possibility of causing interference is preferentially assigned both in the radio base station and the radio mobile station to reduce number of times of retrieving the channel up to transition in establishing call and whereby shorten a period required in establishing call connection.

Next, discussion will be given for the preferred embodiment of a speech channel assignment system according to the present invention in order to implement the foregoing method.

Figure 4:
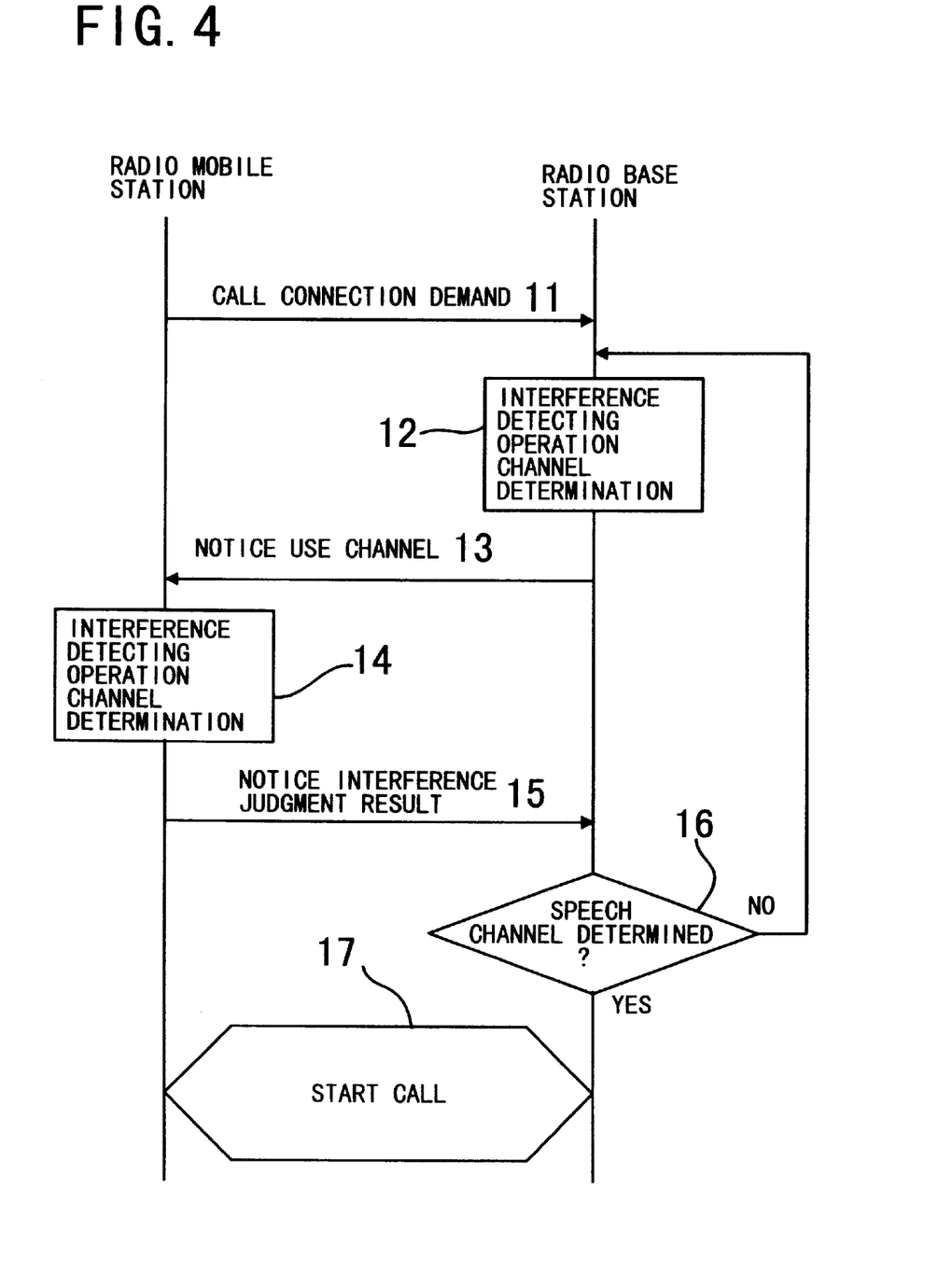
FIG. 4 is an illustration showing exchange of signal between a radio mobile station and a radio base station of FIG. 1.
Figure 5A:
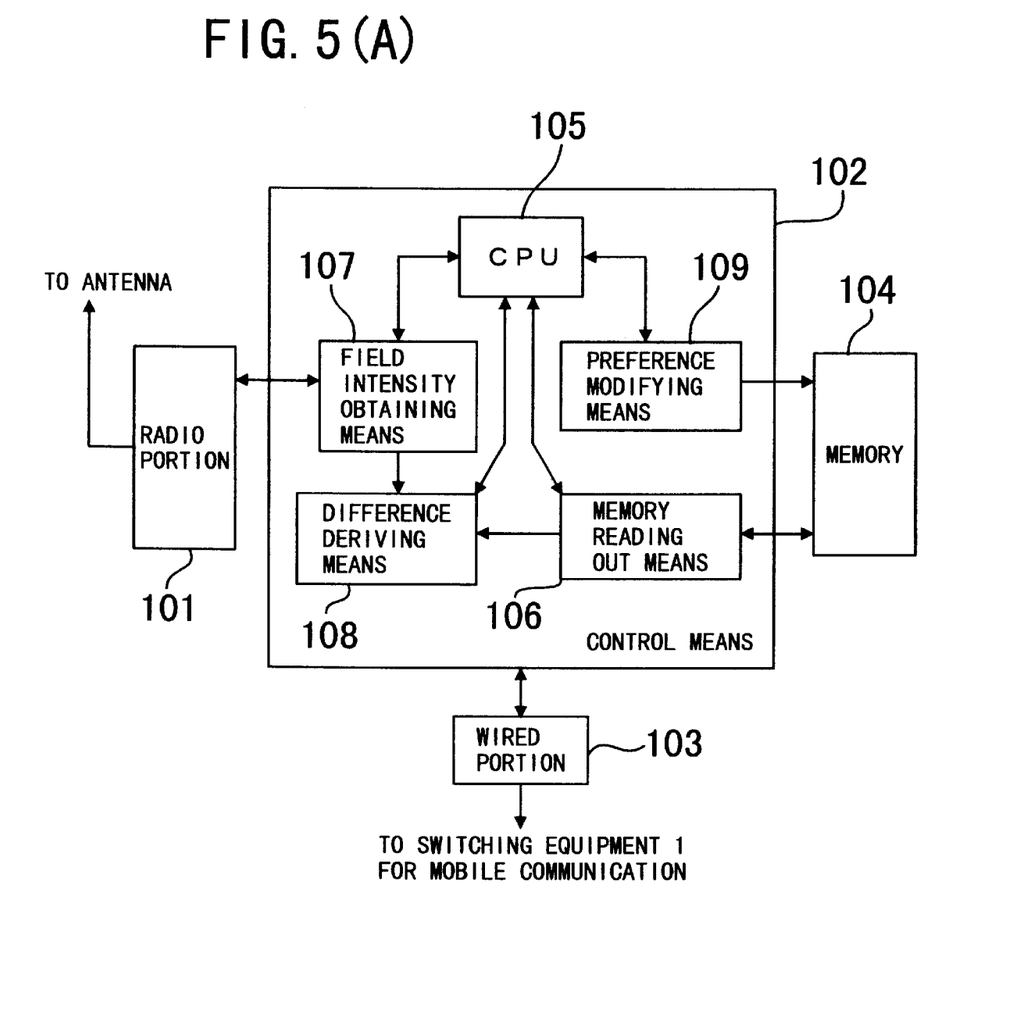
FIG. 5A is a block diagram showing a construction of a system of the radio base station of FIG. 1.
Figure 5B:
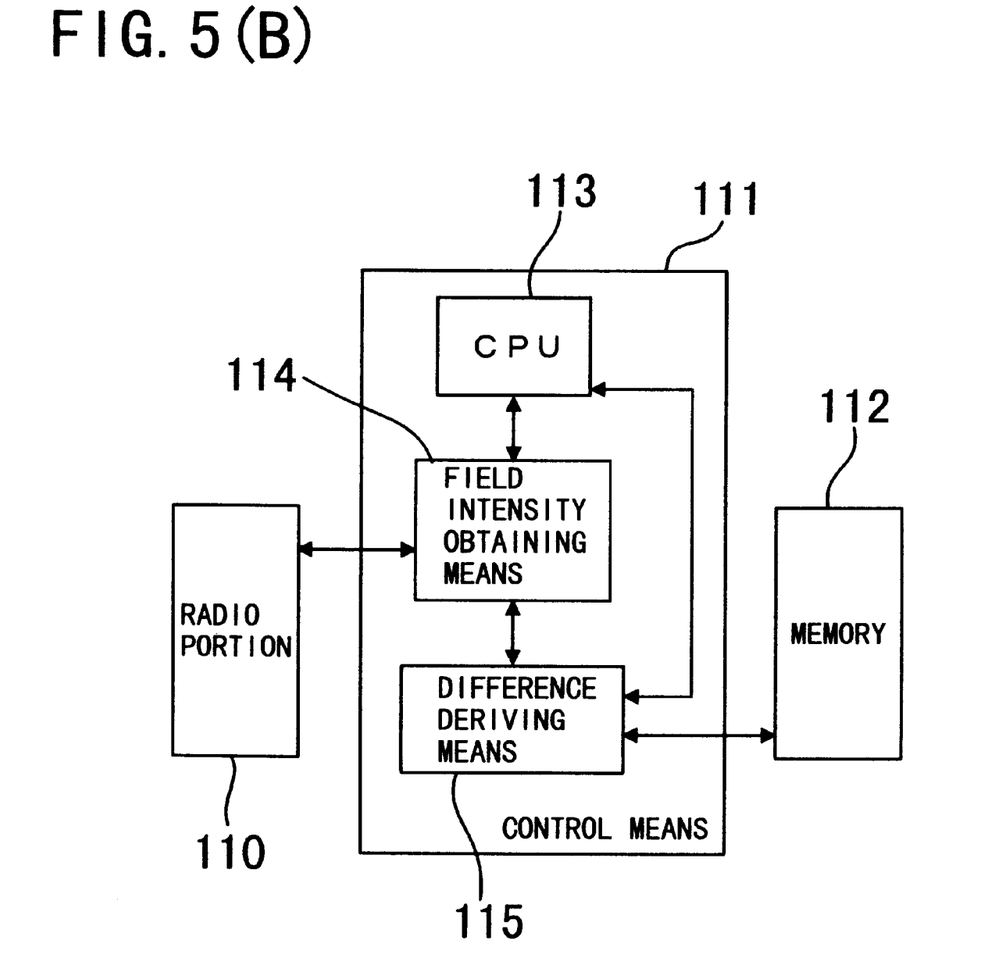
FIG. 5B is a block diagram showing a construction of a system of the radio mobile station.
Figure 6:
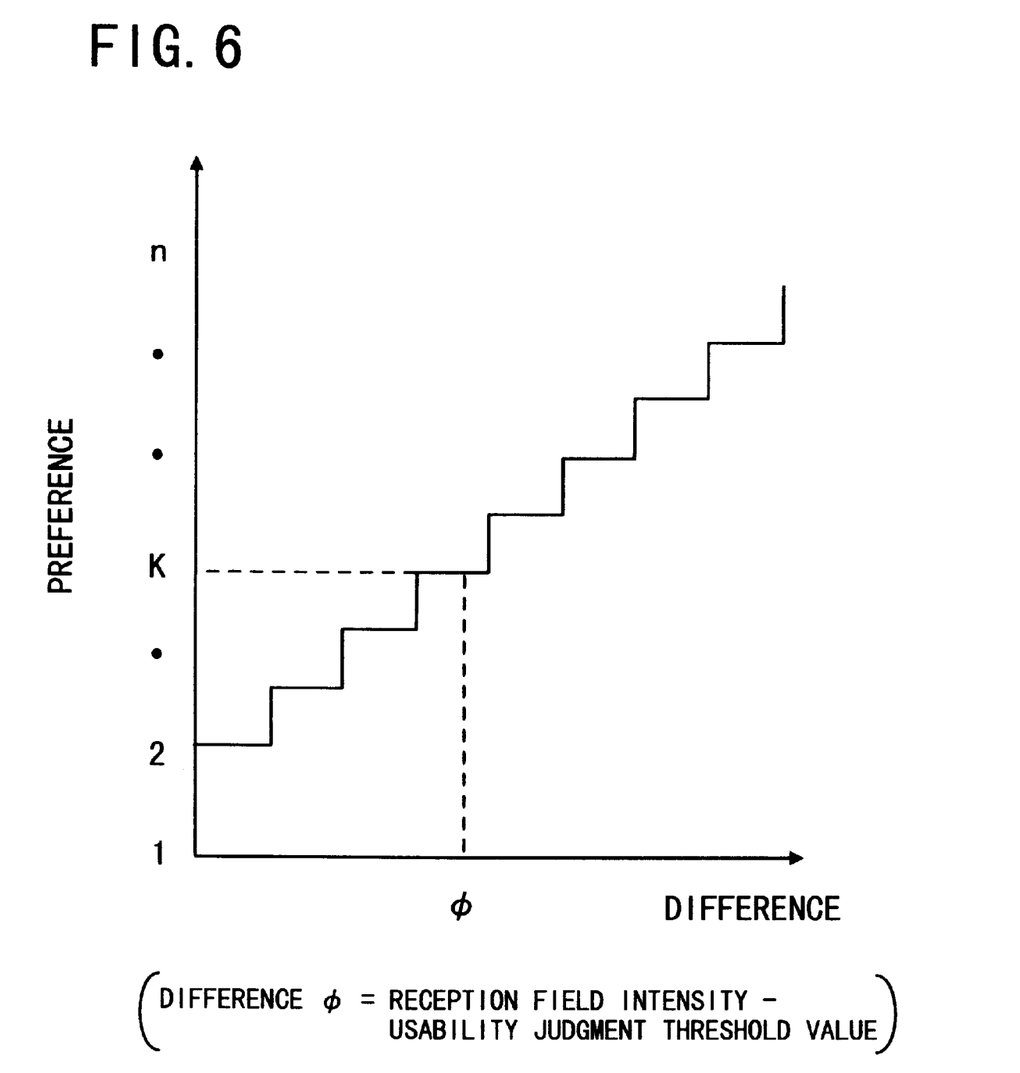
FIG. 6 is an illustration showing a difference/preference conversion table stored in a memory of FIG. 5A.

FIG. 4 is an illustration showing exchange of signal between a radio mobile station and a radio base station of FIG. 1, FIG. 5A is a block diagram showing a construction of a system of the radio base station of FIG. 1, FIG. 5B is a block diagram showing a construction of a system of the radio mobile station, and FIG. 6 is an illustration showing a difference/preference conversion table stored in a memory of FIG. 5A.

A system on the side of radio base station shown in FIG. 5A is constructed with a radio portion 101, a control portion 102, a wired portion 103 and a memory 104. The radio portion 101 modulates and demodulates a signal from the control portion 102 and a signal from the radio mobile station to exchange signals with the radio mobile station. Also, the radio portion 101 performs measurement of the reception field intensity for a channel designated by the control portion 102 and reports the result of measurement to the control portion 102. The wired portion 103 includes an interface with the switching equipment 1 for mobile communication shown in FIG. 1 for exchanging signals with the switching equipment 1 for mobile communication. The memory 104 has a table per channel number K to be used and stores preference and usability judgment threshold valve per channel. The control portion 102 includes CPU 105, memory reading out means 106 for reading out the preference and the usability judgment threshold value per channel stored in the memory 104, field intensity obtaining means 107 obtaining field intensity of the channel in question measured by the radio portion 101 and difference deriving means 108 for deriving a difference between the field intensity obtained and the usability judgment threshold value read out from the memory 104.

A system on the side of the radio mobile station shown in FIG. 5B is constructed with a radio portion 110, a control portion 111 and a memory 112. The radio portion 110 modulates and demodulates a signal from the control portion 111 and a signal from the radio base station to exchange signals with the radio base station. Also, the radio portion 110 measures the reception field intensity of the current channel to report to the control portion 111. The control portion 111 includes CPU 113, field intensity obtaining means for obtaining field intensity of the channel measured by the radio portion 101, difference deriving means 115 deriving a difference between the obtained field intensity and a usability judgment threshold value read from the memory 112.

The operation of the shown embodiment of the speech channel assignment system according to the present invention will be explained with reference to the flowchart of FIG. 3 and the chart of exchange of the signals between the radio base station and the radio mobile station of FIG. 4.

When communication between the radio mobile station and the radio base station becomes necessary, a call connection demand (11 of FIG. 4) is noticed from the radio mobile station to the radio base station. In the radio base station, the control portion 102 receiving the demand demodulated by the radio portion 101 recognizes necessity of establishing of call connection to read out the channel number K of the highest preference (step 1) and the usability judgment threshold valve T(K) (step 2) stored in the memory 104 in order to retrieve the channel to be used, by the memory reading out means 106.

Then, the control portion 102 obtains the reception field intensity of the channel measured by the radio portion by the field intensity obtaining means 107 in order to check a condition of interference of the read out channel K. Then, the control portion 102 compares the reception field intensity information of the channel from the radio portion 101 and the read out usability judgment threshold value by the difference deriving means 108 to calculate the difference (step 3). When the reception field intensity is greater than the usability judgment threshold value and the channel is judged as not useful, the control portion 102 lowers the preference of the channel by a preference modifying means 109 and re-write the preceding preference stored in the memory 104 (step 4). Then, the channel having the highest preference is again read out (step 1) and then the channel is assigned.

On the other hand, when the reception field intensity becomes smaller than the usability judgment threshold value and the channel is judged to be useful, and when the channel having no interference is found as a result of the foregoing process performed again, the control portion 102 notices the channel number K thus selected to the radio portion 101 (12 of FIG. 4). The radio portion 101 modulates this signal to transmit to the radio mobile station in radio as the use channel notice (13 of FIG. 4) (step 5).

In the radio mobile station receiving the use channel notice, the reception field intensity of the channel is measured by the radio portion 110 in order to detect interference of the channel. Then, the control portion 111 of the radio mobile station obtains the reception field intensity measured by the radio portion 110 by the field intensity obtaining means 114 and derives a difference between the obtained reception field intensity and the usability judgment threshold value read out from the memory 112 by the difference deriving means 115 (14 of FIG. 4). When the reception field intensity becomes smaller than the usability judgment threshold value and the channel is judged as useful (step 6), "the channel can be used" is noticed to the radio base station by an interference judgment result notice (15 of FIG. 4). The usability judgment threshold value may be the same value or different values in the radio base station and the radio mobile station. On the other hand, when the reception field intensity becomes greater than the usability judgment threshold value and thus the channel is judged as not being useful, the interference judgment result notice (15 of FIG. 4) indicative of "the channel is in interference" and the difference between the reception field intensity and the usability judgment threshold value are noticed to the radio base station. The radio portion 101 of the radio base station receiving the foregoing notice demodulates the signal to notice to the control portion 102. The control portion 102 performs process for lowering the preference of the channel in question in the extent corresponding to the difference (step 4) to re-write the preceding preference of the memory 104 to perform retrieval of the channel to be used, again (step 1).

After determining the channel to be used on both of the radio base station and the radio mobile station, the process moves to establishment of call connection (step 7 of FIG. 3, 16 of FIG. 4).

The foregoing method of assignment of the preference of the channel will be discussed with reference to FIG. 6.

A management form of the preference of the channel on he memory 104 will be shown in the following table 1.

TABLE 1

| Preference | Use Channel |
| --- | --- |
| 1 | CH1 |
| 2 | CH2 |
| 3 | CH3 |
| . | . |
| . | . |
| . | . |
| n | CHn |

From the foregoing table, it will be appreciated that each channel is managed per preference. When call connection is demanded, the channel CH1 having the highest preference is read out. When interference is present on either the radio base station or radio mobile station, a process for lowering preference of the channel CH1 is performed. A difference of the reception field intensity and the usability judgment threshold value is obtained by the control portion 102 to determine the preference of the channel CH1 after lowering of preference according to a difference/preference conversion table shown in FIG. 6. In FIG. 6, a difference between the reception field intensity and the usability judgment threshold value is assumed to be φ and the reference at that time is k. Subsequently, the preferences of the channels presenting in the preference k−1 on the memory 104 are up-shifted to write the channel CH1 in the preference k. The management table after modifying of the channel CH1 is shown in the following table 2.

TABLE 2

| Preference | Use Channel |
| --- | --- |
| 1 | CH2 |
| 2 | CH3 |
| 3 | CH4 |
| . | . |
| . | . |
| . | . |
| k | CH1 |
| . | . |
| . | . |
| . | . |

By the process, the preference of the channel receiving large interference is lowered.

In the shown embodiment of the channel assigning method, the preference taking the interference condition on the radio mobile station is used to make judgement whether the channel can be used not by checking presence of interference from the channel having higher preference so that the preference is assigned for the channels with weighting corresponding to degree of interference. Therefore, as the channels of higher preference, the channels having lesser record of occurrence of interference are concentrated. Also, the channels having larger record of occurrence of interference are concentrated in the lower preferences. Also, the preferred system can be realized by only modification of software currently used to restrict increasing of the cost.

As set forth above, by assigning the channel on the basis of the preference determined with taking the radio interference condition, the following effects can be achieved.

(1) The channel having lesser possibility of causing interference can be noticed to the radio mobile station.

(2) Since in both of the radio base station and the radio mobile station, assignment of channel is attempted from the channel having lesser possibility of causing interference, number of times of retrieval of the channel before transition to establishment of call connection can be reduced to shorten a period required for establishing call connection.

(3) Since the preference of the channel is determined depending upon degree of interference, the channels difficult to cause interference and the channels easily causing interference are discriminated from time to time. This enables spatial re-use of the channel between the radio base stations.

(4) The preferred embodiment of the speech channel assigning system can be realized by merely modifying a part of the currently used software of the radio base station, system cost can be restricted.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A method for assigning a speech channel of a mobile communication system, in which a plurality of radio base stations have a plurality of speech channels in common, comprising the steps of:

setting a preference for assigning a speech channel in said radio base station;

selecting a speech channel having a highest preference;

notifying a radio mobile station of said selected speech channel to establish a call connection by said radio base station;

measuring at the mobile station a radio interference condition of the speech channel notified by said radio base station and transmitting the radio interference condition to said radio base station, modifying the preference of said speech channel on the basis of said radio interference condition of said speech channel received from said radio mobile station, by said radio base station; and assigning new speech channel in said radio base station on the basis of the modified preference.

2. A method for assigning a speech channel of a mobile communication system, in which a plurality of radio base stations have a plurality of speech channels in common, comprising the steps of:

setting a preference for assigning a speech channel in said radio base station;

selecting a speech channel having a highest preference;

notifying a radio mobile station of said selected speech channel to establish call connection by said radio base station;

measuring a field intensity of the selected speech channel at the mobile station and transmitting the measured field intensity to said radio base station;

modifying the preference of said speech channel on the basis of the measured field intensity from said radio mobile station; and assigning new speech channel in said radio base station on the basis of the modified preference.

3. A method for assigning a speech channel of a mobile communication system, in which a plurality of radio base stations have a plurality of speech channels in common, comprising the steps of:

setting a preference for assigning a speech channel in said radio base station;

modifying the preference of said speech channel when radio interference is present in the assigned channel, in said radio base station;

selecting a channel having a highest preference;

notifying a radio mobile station of said selected speech channel to establish call connection by said radio base station;

measuring a radio interference condition of the speech channel at said mobile station and transmitting the radio interference condition to said radio base station;

modifying the preference of said speech channel on the basis of said radio interference condition of said speech channel received from said radio mobile station; and assigning a new speech channel in said radio base station on the basis of the modified preference.

4. A system for assigning a speech channel of a mobile communication system, in which a plurality of radio base stations have a plurality of speech channels in common and a plurality of radio mobile stations are adapted for communication with said radio base stations using said speech channel, said radio mobile station including:
      means for measuring radio interference condition of a speech channel noticed from said radio base station; and
      means for notifying a radio interference information resulting from said measurement to said radio base station; and said radio base station including:
      means for setting a preference of the speech channel to be assigned;
      means for modifying said preference of said speech channel on the basis of said radio interference information of said channel received from said radio mobile station; and
      means for assigning a new speech channel on the basis of a modified preference.

5. A system for assigning a speech channel of a mobile communication system, in which a plurality of radio base stations have a plurality of speech channels in common and a speech channel to be used is individually assigned and a plurality of radio mobile stations adapted for communication with said radio base stations using said speech channel, said radio mobile station including:
      means for deriving a difference between a field intensity of the speech channel noticed by said radio base station and a threshold value; and
      means for notifying said difference to said radio base station; and said radio base station including:
      means for setting a preference of the speech channel to be assigned;
      means for modifying said preference of said speech channel on the basis of said difference notified by said radio mobile station in the extent corresponding to said difference; and
      means for newly assigning a speech channel on the basis of modified preference.

6. A system for assigning a speech channel of a mobile communication system, in which a plurality of radio base stations have a plurality of speech channels in common and a speech channel to be used is individually assigned and a plurality of radio mobile stations adapted for communication with said radio base stations using said speech channel, said radio mobile station including:
      means for measuring radio interference condition of a speech channel noticed from said radio base station; and
      means for notifying a radio interference information resulting from said measurement to said radio base station; and said radio base station including:
      means for setting a preference of the speech channel to be assigned;
      means for measuring radio interference condition of said assigned speech channel;
      means for modifying said preference of said speech channel on the basis of said radio interference information thus measured and said radio interference information of said channel received from said radio mobile station; and
      means for assigning a new speech channel on the basis of a modified preference.

7. A system for assigning a speech channel of a mobile communication system, in which a plurality of radio base stations having a plurality of speech channels in common and a speech channel to be used is individually assigned and a plurality of radio mobile stations adapted for communication with said radio base stations using said speech channel said radio mobile station including:
      means for deriving a difference between a field intensity of the speech channel noticed by said radio base station and a threshold value; and
      means for notifying said difference to said radio base station; and said radio base station including:
      means for setting a preference of the speech channel to be assigned;
      means for deriving a difference between the field intensity of assigned speech channel and a threshold value;
      means for modifying said preference of said speech channel on the basis of said difference thus derived and said difference notified by said radio mobile station; and
      means for newly assigning a speech channel on the basis of modified preference.

8. A method of assigning communication channels between a base station and a mobile station, comprising the steps of:

storing a table of possible communication channels in said base unit;

assigning a preference to each of said communication channels, selecting a channel having a highest preference when a call is to be initiated;

notifying said mobile station of said selected channel;

measuring a field intensity of said selected channel at said mobile station;

transmitting said measured field intensity to said base station;

comparing said measured field intensity with a threshold value to determine interference on said selected channel;

assigning said selected communication channel if an acceptable level of interference is present; and lowering said preference of said selected channel if unacceptable levels of interference is present and selecting a next channel having a highest preference.

* * * * *

UNITED STATES PATENT AND TRADEMARK OFFICE
CERTIFICATE OF CORRECTION

PATENT NO.: 6,122,517
DATED: September 19, 2000
INVENTORS: Tomoyasu IMAMURA

It is certified that error appears in the above-identified patent and that said Letters Patent is hereby corrected as shown below.

On the face of the patent, in the title, field [54], delete "METHOD AND SYSTEM FOR ASSIGNING SPEECH CHANNEL IN MOBILE SYSTEM" and insert
-- METHOD AND SYSTEM FOR ASSIGNING SPEECH CHANNEL IN MOBILE COMMUNICATION SYSTEM --.

Signed and Sealed this

Twenty-fourth Day of April, 2001

Attest:

NICHOLAS P. GODICI

Attesting Officer        Acting Director of the United States Patent and Trademark Office